United States Patent [19]
Flammer

[11] Patent Number: 5,465,398
[45] Date of Patent: Nov. 7, 1995

[54] AUTOMATIC POWER LEVEL CONTROL OF A PACKET COMMUNICATION LINK

[75] Inventor: George H. Flammer, Cupertino, Calif.

[73] Assignee: Metricom, Inc., Los Gatos, Calif.

[21] Appl. No.: 134,193

[22] Filed: Oct. 7, 1993

[51] Int. Cl.⁶ .................................................. H04B 7/00
[52] U.S. Cl. ........................ 455/69; 455/67.1; 455/88; 455/115
[58] Field of Search .......................... 455/69, 70, 127, 455/88, 126, 115, 67.1, 226.1, 226.2; 375/296

[56] References Cited

U.S. PATENT DOCUMENTS

| | | | |
|---|---|---|---|
| 4,495,648 | 1/1985 | Giger | 455/69 |
| 4,777,653 | 10/1988 | Bonnerot et al. | 455/69 |
| 4,816,825 | 3/1989 | Chan et al. | 340/825.5 |
| 4,868,885 | 9/1989 | Perry | 455/10 |
| 4,934,983 | 6/1990 | Miyo | 455/8 |
| 5,060,302 | 10/1991 | Grimes | 359/135 |
| 5,107,225 | 4/1992 | Wheatley, III et al. | 330/279 |
| 5,115,429 | 5/1992 | Hluchyj et al. | 370/84 |
| 5,115,433 | 5/1992 | Baran et al. | 370/94.3 |
| 5,172,373 | 12/1992 | Suzuki | 370/85.11 |
| 5,241,690 | 8/1993 | Larsson et al. | 455/69 |
| 5,305,468 | 4/1994 | Bruckert et al. | 455/69 |

Primary Examiner—Edward F. Urban
Assistant Examiner—Doris To
Attorney, Agent, or Firm—Townsend and Townsend and Crew; Kenneth R. Allen; Dan H. Lang

[57] ABSTRACT

In a wireless LAN packet communication system, for each successfully received packet the strength of the received signal is measured at a target node by monitoring an A/D converted rssi (received signal strength indication) signal. A record of minimum strength among successfully received packets is maintained at the target node. For each successfully received packet the difference between the signal strength of the packet and the recorded minimum is calculated at the target node and sent over the link to the source node as a quantitative difference indicator. The source node maintains a moving average of difference indicators received over time and adjusts the transmitter power level so as to maintain the moving average at a preselected link margin threshold level. Alternatively, the calculation of a desired source node power level change is performed at the target node and transmitted to the source node.

11 Claims, 6 Drawing Sheets

AUTOMATIC POWER LEVEL CONTROL OF A PACKET COMMUNICATION LINK

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

MICROFICHE APPENDIX

This application has been filed with a microfiche appendix of 85 frames in length containing source code listings of elements of one embodiment of the present invention.

BACKGROUND OF THE INVENTION

The invention relates generally to a method and system for wireless communications of packets. For successful communications of the packets, the received signal power must be sufficient to mask the noise. For a given link between a source node and a target node, the signal power received at the target node depends on the signal power transmitted at the source node, on the characteristics of the node antennas, and on the length and characteristics of the propagation path between the nodes. Thus, one technique for increasing signal power received at the target node and thereby raising the likelihood of successful packet communications is to increase source node transmitter power.

There are however disadvantages to increasing source node transmitter power. High transmitter power implies shorter battery life in mobile systems and higher energy costs in fixed systems. If the packet communications link shares spectrum with other such links or other services, high transmitter power leads to more interference to those links and services. High transmitter power also renders communications less secure by allowing for packet interception over a wider area. It is therefore desirable to transmit using only the minimum power necessary for reliable communication.

There have been several approaches to the problem of minimizing source node transmitter power while maintaining link reliability. One technique has been to compute the minimum transmitted power when designing the link and incorporate appropriate attenuation values in the specifications of transmission equipment constructed for the link. Link margin is added to the minimum transmitter power to allow for naturally occurring variations in link attenuation and performance variations in the equipment.

There are several problems with this approach. Link conditions may change over time. Antennas may be replaced. There may be both long-term and short-term variations in propagation conditions and equipment performance. One or both nodes of the link may be mobile making computation of a fixed minimum transmitter power impossible.

A second technique has been to make manual measurements at each node of the link to determine the minimum transmitter power. Transmitter attenuation can then be adjusted manually according to the measurement. A disadvantage of this approach is that any change in link conditions necessitates manual readjustment of the transmitter attenuation.

A more sophisticated technique is to use the target node receiver itself as a precision power measuring instrument. The receiver by tracking its own power measurements over time determines the minimum signal it requires. Knowing the link characteristics and the desired link margin, the receiver can then compute the desired transmitter power and convey this information to the other end of the link where the transmitter can adapt its power as specified.

This approach also has problems. Economical reliable receivers that also perform as accurate signal power measurement instruments are difficult to design. It is also difficult to economically manufacture and operate transmitters that can accurately and repeatably set a specified output power level. The requirement that the receiver and transmitter measure and adjust power in the same units further raises the cost of implementation.

A simplified variation on this approach was disclosed in U.S. Pat. No. 5,107,225. Therein is disclosed a receiver AGC (Automatic Gain Control) circuit where the gain control voltage is derived from an integrated quantitative indicator of received signal strength. The gain control voltage is used to adjust both the receiver gain and the power output of a co-located transmitter. No power adjustment data is sent to the transmitter on the opposite side of the link.

What is needed is a low-cost, reliable mechanism for minimizing transmitted power while maintaining reliable communications between a source node and a target node.

SUMMARY OF THE INVENTION

According to the invention, in a wireless LAN packet communication system, for each successfully received packet the strength of the received signal is measured at a target node by monitoring an A/D converted rssi (received signal strength indication) signal. A record of minimum strength among successfully received packets is maintained at the target node. For each succesfully received packet the difference between the signal strength of the packet and the recorded minimum is calculated at the target node and sent over the link to the source node as a quantitative difference indicator. The source node maintains a moving average of difference indicators received over time and adjusts the transmitter power level so as to maintain the moving average at a preselected link margin threshold level. Alternatively, the calculation of a desired source node power level change is performed at the target node and transmitted to the source node.

The invention allows for simple, economical and reliable receiver and transmitter hardware. Target node receiver signal strength measurements and source node transmitter power settings may be course and unstable over temperature and time. The source node and target node need not share a precise power calibration.

DESCRIPTION OF SPECIFIC EMBODIMENTS

Figure 1:
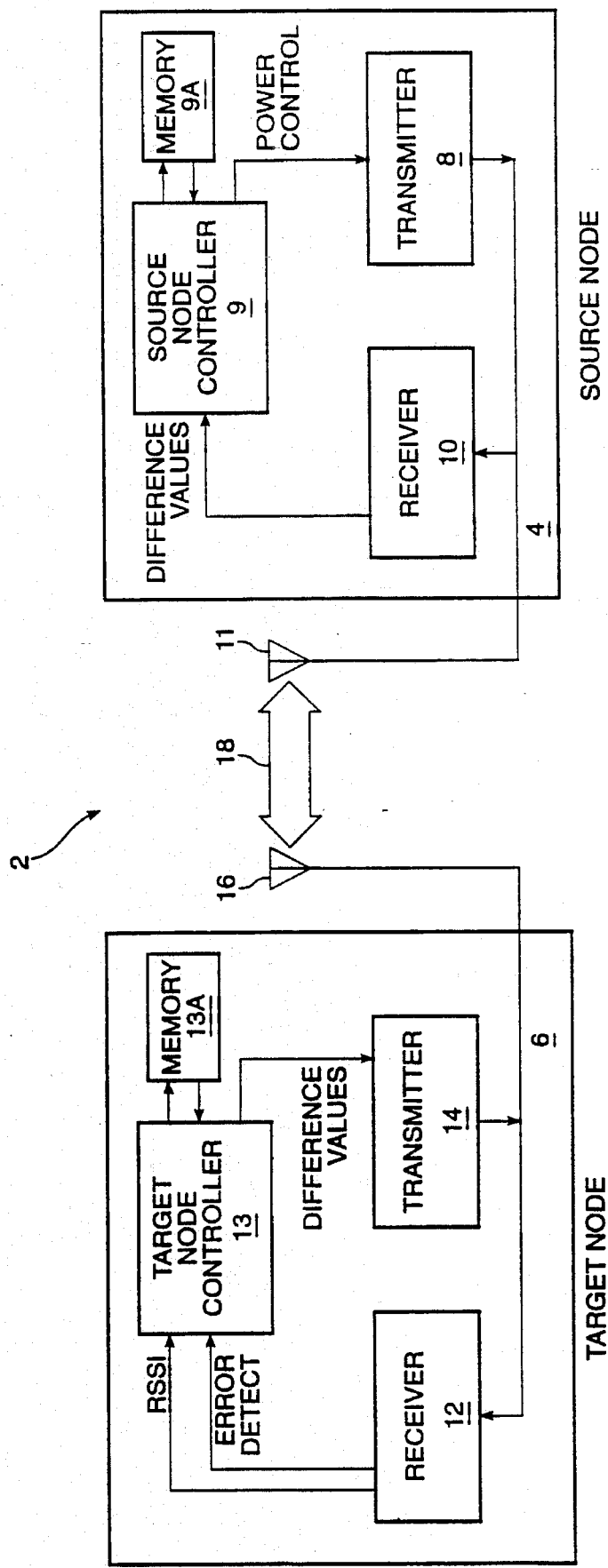
FIG. 1 is a block diagram of a packet network with a source node and a target node having power control elements in accordance with the invention.

FIG. 1 depicts a block diagram of a packet network 2 according to the invention. There is a source node 4 and a target node 6. The source node 4 is equipped with a transmitter 8 for sending packets, a source node controller 9, a source node controller memory 9A a receiver 10 for receiving transmitter power adjustment information and an antenna 11. The target node 6 is equipped with a receiver 12 for receiving packets, a target node controller 13, a target node controller memory 13A, a transmitter 14 for transmitting power adjustment information and an antenna 16. There is a propagation path 18 between the target node 6 and source node 4.

In operation of the packet network 2, a packet may be communicated by the source node 4 to the target node 6. The source node transmitter 8 encodes the packet as modulation on an electromagnetic signal. The source node transmitter 8 amplifies this electromagnetic signal to a power level adjustable by the source node controller 9. Source node antenna 11 radiates the amplified electromagnetic signal over propagation path 18 to target node antenna 16. Target node receiver 12 retrieves the packet information from the modulated electromagnetic signal.

Figure 2:
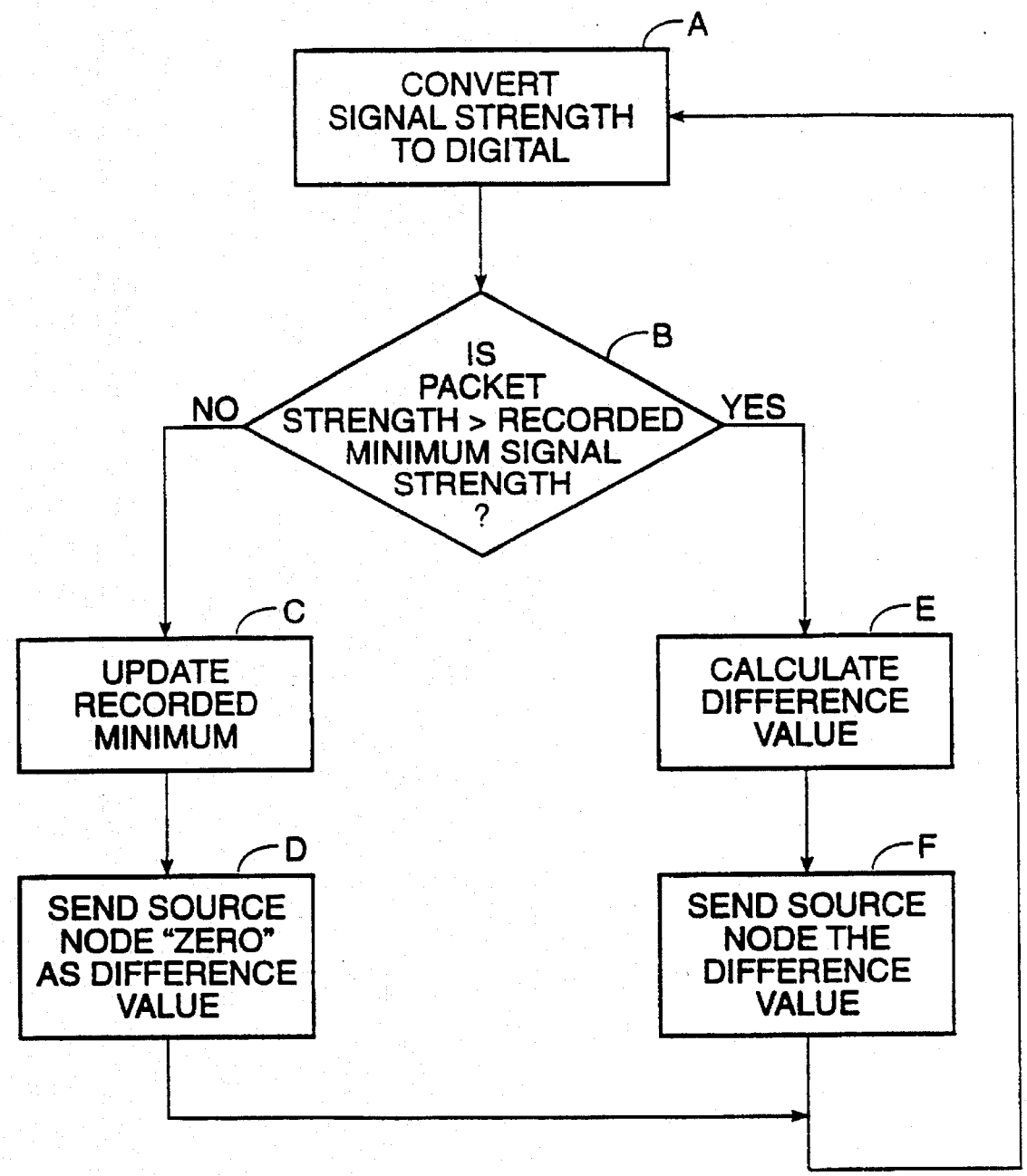
FIG. 2 is a flowchart illustrating the operation of the target node controller according to one embodiment of the invention.

The target node controller 13 and source node controller 9 cooperate to minimize the source node transmitter power level. FIG. 2 is a flowchart illustrating the operation of the target node controller 13 according to one embodiment of the invention. The target node controller 13 monitors an analog received signal strength indication (rssi) from the target node receiver 12. For each successfully received packet, the target node controller 13 converts the analog rssi to a quantitative indicator of signal strength (Step A). The packet's signal strength is compared to a minimum previously recorded in target node controller memory 13A (Step B). If the packet's strength is lower, the recorded minimum is updated (Step C). The target node controller 13 then uses the target node transmitter 14 to send the source node 4 a zero value as an indicator of the difference between the power of the most recently received packet and the recorded minimum signal strength (Step D). If the packet's strength is higher than the previously recorded minimum, the target node controller 13 calculates the difference between the packet's strength and the previously recorded minimum (Step E). The target node controller 13 then sends this difference to the source node 4 as a quantitative difference indicator (Step F). The difference indicator also serves as an acknowledgement that the packet was successfully received.

Figure 3:
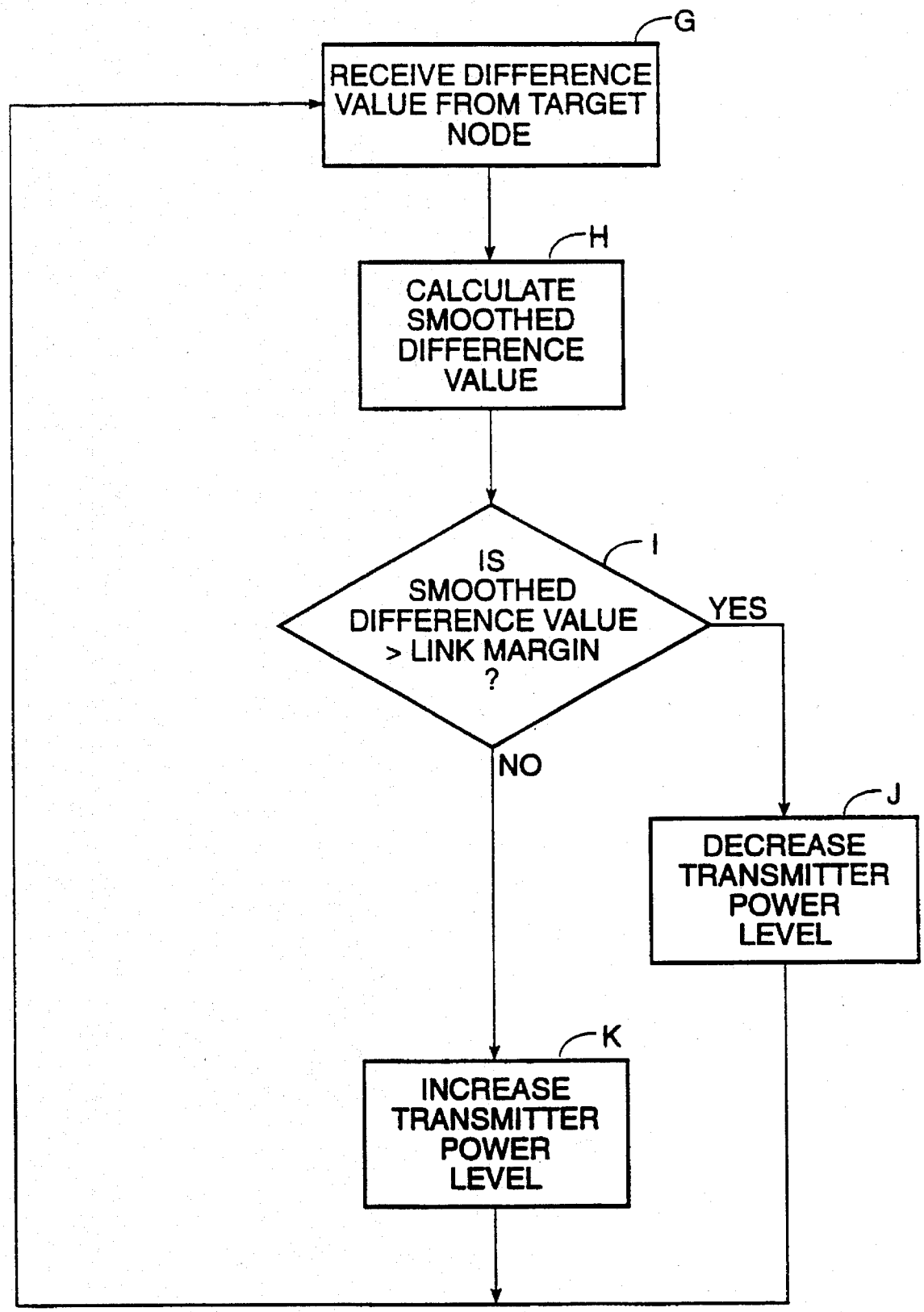
FIG. 3 is a flowchart illustrating the operation of the source node controller according to one embodiment of the invention.

FIG. 3 is a flowchart illustrating the operation of the source node controller 9. The source node controller 9 accepts the difference indicators from the target node controller 13 through the source node receiver 10 (Step G). The source node controller 9 maintains a record of a plurality of the most recently received difference indicators in source node controller memory 9A and applies a smoothing transformation to them to obtain a smoothed difference indicator (Step H). Alternatively, the smoothing transformation is applied by the target node controller 13. In one embodiment, the smoothing transformation is a moving average. The source node controller 9 then subtracts this smoothed difference indicator from a pre-selected link margin value to obtain an error value which is stored in source node controller memory 9A (Step I).

If the error value is positive, the source node controller 9 decreases the source node transmitter power level by an amount proportional to the error value (Step J). If the smoothed difference indicator is smaller, the source node controller increases the source node transmitter power level by an amount proportional to the error value (Step K). In an alternative embodiment, the transmitter power level adjustment is not proportional to the error value but is otherwise derived from it.

In the case of an unsuccessfully received packet, the source node controller 9 notes the lack of an acknowledgement from the target node 6. Steps G-K occur as above except that the missing difference indicator will be treated as if it were zero or negative thus decreasing the smoothed difference value and thereby increasing the transmitter power level. The unsuccessfully received packet is retransmitted at the increased transmitter power level.

Thus the source node controller 9 uses the difference indicators sent from the target node controller 13 to minimize the source node transmitter power level while maintaining a link margin. This method has many advantages. Since the difference indicators are sent rather than a desired source node transmitter power level, the target node controller 13 need not be aware of any link characteristics. The smoothing transformation applied to the difference indicators assures that source node transmitter 8 power level will not fluctuate wildly in response to momentary changes in link conditions. The link margin value may be adjusted by a network operator to achieve a desired trade-off between network reliability and source node transmitter power level.

Figure 4:
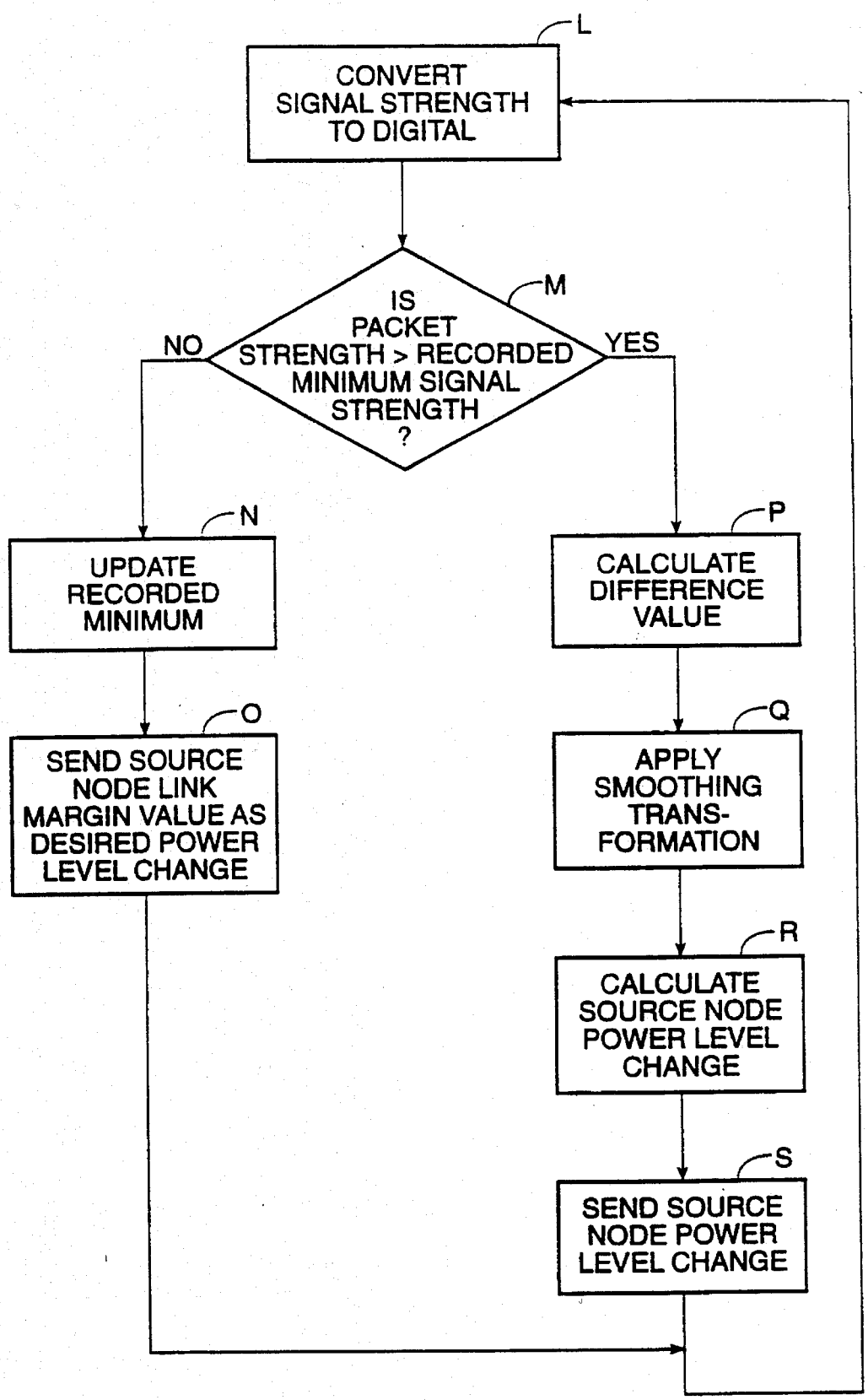
FIG. 4 is a flowchart illustrating the operation of the target node controller according to an alternate embodiment of the invention.

In an alternate embodiment of the invention, the target node controller directly calculates a desired source node power level change and sends it to the source node. FIG. 4 is a flowchart illustrating the operation of the target node controller according to this embodiment. The target node controller 13 monitors an analog received signal strength indication (rssi) from the target node receiver 14. For each successfully received packet, the target node controller 13 converts the analog rssi to a quantitative indicator of signal strength (Step L). The packet's signal strength is compared to a minimum previously recorded in the target node controller memory 13A (Step M). If the packet's strength is lower, the recorded minimum is updated (Step N). The target node controller 13 then uses the target node transmitter 14 to send the source node 4 a preselected link margin value as an indication of the desired power level change (Step O).

If the packet's strength is higher than the recorded minimum, the target node controller 13 calculates a difference indicator reflecting the difference between the packet's strength and the previously recorded minimum (Step P). A smoothing transformation is applied to a series of these difference indicators which have been stored in target node controller memory 13A to obtain a smoothed difference indicator which is also stored in target node controller memory 13A (Step Q). In one embodiment, the smoothing transformation is a moving average. The target node controller then derives a desired source node power level change indicator from the smoothed difference indicator (Step R). In one embodiment, the source node power level change is proportional to the smoothed difference value. The target node controller 13 changes the source node power level so as to maintain the smoothed difference indicator at a preselected link margin value. The source node power level change indicator is sent to the source node 4 using the target node transmitter 14. (Step S).

Figure 5:
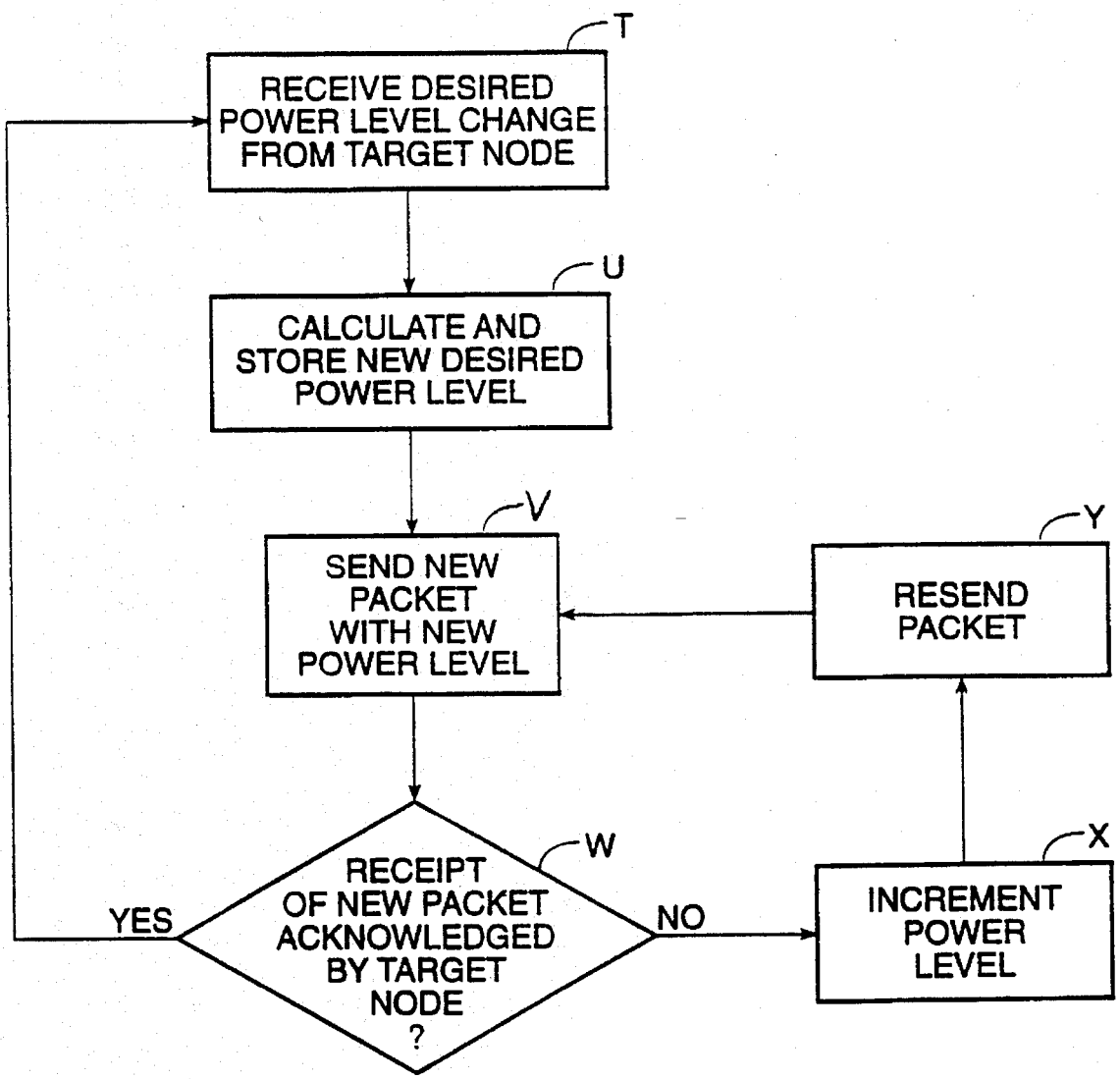
FIG. 5 is a flowchart illustrating the operation of the source node controller according to an alternate embodiment of the invention.

FIG. 5 is a flowchart illustrating the operation of the source node controller 9 in response to source node power level changes indicators received from the target node 6. The source node controller 9 accepts the power level change indication from the target node controller 13 through source node receiver 10 (Step T). The source node controller 9 then calculates a new source node transmitter power level from the old power level and the power level change received from the target node. The new power level is stored in the source node controller memory (Step U). The next packet is transmitted by the source node transmitter using the new power level (Step V). The source node controller 9 checks for an acknowledgemt. (Step W). If there is no acknowledgement, the source node transmitter power level is incremented (Step X) and the packet is retransmitted (Step Y).

In the embodiments described above, the received signal power measurement made at the target node 6 and transmitter power adjustment made at the source node 4 may be coarse and imprecisely calibrated thus allowing for economical implementation. Source node transmitter power is regulated with whatever measurement and adjustment precisions are available.

In one embodiment, the target node controller 13 is modified to assure that link margin is maintained in spite of time or temperature drift on the part of the receiver signal power measurement. The indicator of the minimum successfully received signal strength stored in target node controller memory 13A is incremented periodically. The difference values sent to the source node 4 thus decrease causing the source node controller 9 to increase source node transmitter 8 power. Alternatively, the decreasing difference values cause the target node controller 13 to directly instruct the source node controller 9 to increase source node transmitter power.

If the received signal power measurement calibration has not drifted, the minimum received successful signal strength will decrease toward its pre-incrementation level in response to successfully received lower power signals. On the other hand if the received signal power measurement has drifted in the direction of greater sensitivity, the new minimum will hold, thus preserving link margin without the loss of any packets. Thus an economical received signal power measurement device that is not stable over time or temperature may be used without compromising link margin.

Figure 6:
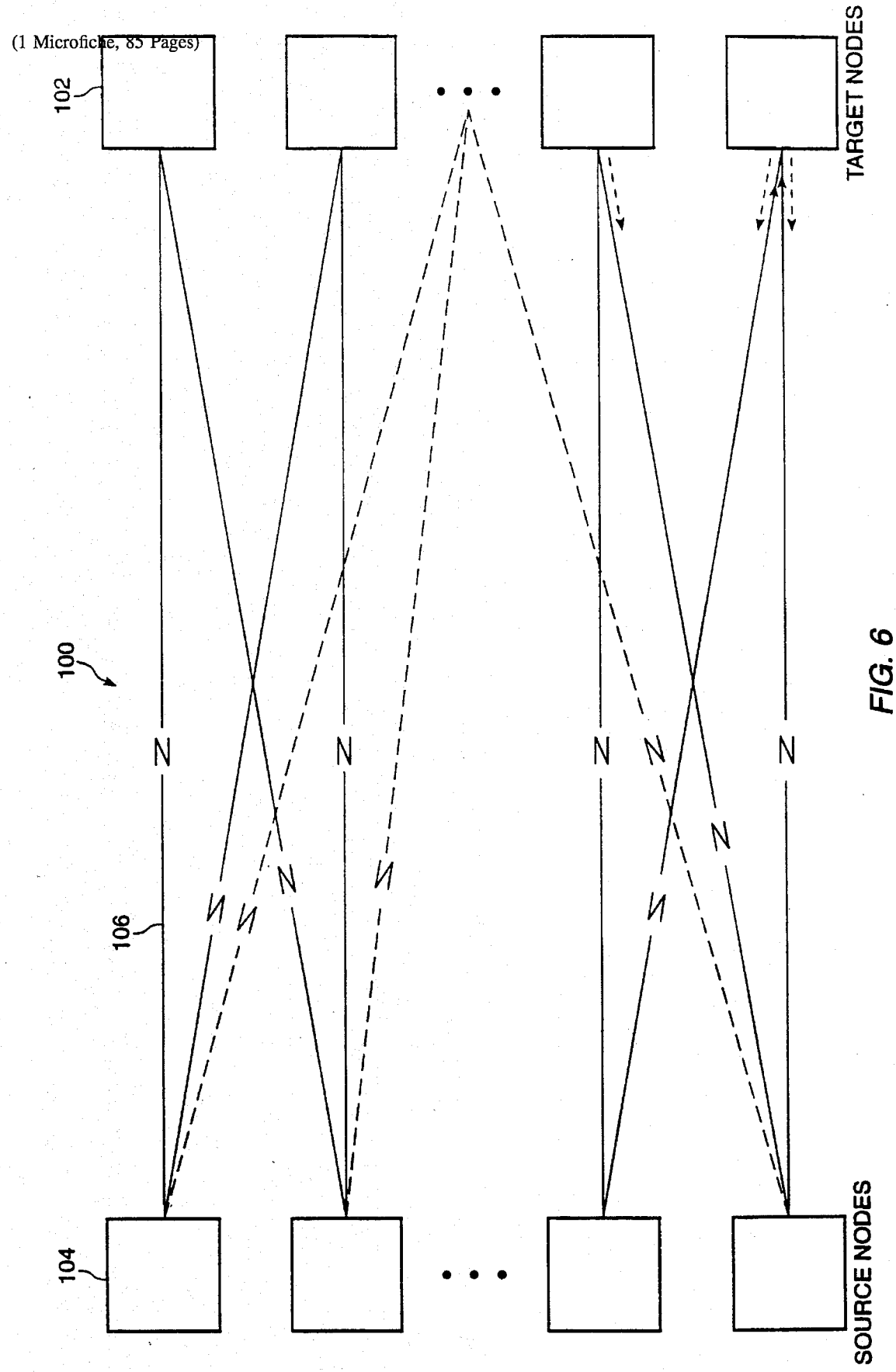
FIG. 6 is a block diagram of a packet network with a plurality of source nodes and target nodes and a plurality of links between the source nodes and target nodes.

Referring now to FIG. 6, a packet network 100 comprising a plurality of target nodes 102 interacting with a plurality of source nodes 104 through a plurality of wireless links 106 is depicted. Each target node is similar to the target node illustrated in FIG. 1 and has a receiver, a transmitter, an antenna and a target node controller. Each source node is similar to the source node illustrated in FIG. 1 and has a receiver, a transmitter, an antenna and a source node controller. Each link connects one target node with one source node. Each target node is connected via a link to one or more source nodes. Each source node is connected via a link to one or more target nodes. Each source node controller can independently set the transmitter power for each link which connects the source node to a target node. Thus as the source node sends packets to different target nodes over different links, a different output power level may be transmitted over each link.

The power optimization method is similar to that described above for a two node network except that source node transmitter power level is independently optimized for each link. The minimum signal strength for all successfully received packets received at a given target node from all source nodes is maintained at that target node. Each target node then sends each source node difference indicators or power level change indicators calculated as described above for packets received from that source node. The source nodes set the transmitter power level accordingly for each target node to which a given source node is connected by a link. The source node adjusts the transmitter power level for each link to maintain the difference indicators received from each target node at a link margin value. Thus the source node transmitter power level is independently optimized for each link.

The invention has now been explained with reference to specific embodiments. Other embodiments will be apparent to those of ordinary skill in the art. It is therefore not intended that this invention be limited except as indicated by the appended claims.

What is claimed is:

1. In a wireless packet communications link, a method for minimizing power transmitted from a source node to a target node, said method comprising the steps of:

obtaining at the target node a quantitative indicator of received signal strength for a packet successfully received at the target node;

transmitting, from the target node to the source node a quantitative indicator of the difference between said quantitative indicator of received signal strength and a stored minimum of previously obtained quantitative indicators of received signal strength; thereafter repeating said steps of obtaining and transmitting to accumulate a series Of transmitted quantitative indicators of the difference at the source node; and using said transmitted quantitative indicators to adjust a transmitted power level used by the source node to communicate with the target node to be the minimum necessary to reliably transmit a packet.

2. The method of claim 1 further comprising the step of periodically increasing the stored minimum of previously obtained quantitative indicators of received signal strength.

3. The method of claim 1 wherein said step of using said transmitted quantitative indicators comprises the substeps of:

applying a smoothing transformation to said series of transmitted quantitative indicators to obtain a smoothed transmitted quantitative indicator at the source node; and varying said transmitted power level to maintain said smoothed transmitted quantitative indicator at a predetermined threshold value.

4. The method of claim 1 further comprising the step of:

updating the stored minimum when a packet is successfully received at the target node with a signal strength less than the stored minimum.

5. The method of claim 4 further comprising the steps of:

sending an acknowledgement packet from the target node to the source node when a packet is successfully received at the target node; and increasing the transmitted power level used by the source node to communicate with the target node when a packet is sent from the source node to the target node and no acknowledgment is returned from the target 6. In a wireless packet communications link, a method for minimizing power transmitted from a source node to a target node, said method comprising the steps of:

obtaining at the target node a quantitative indicator of received signal strength of a successfully received packet;

calculating at the target node a difference between said quantitative indicator of received signal strength and a stored minimum of previously obtained quantitative indicators of received signal strength;

repeating said steps of obtaining and calculating to accumulate a series of differences at the target node;

applying a smoothing transformation to said series of differences to obtain a smoothed difference indicator at the target node;

transmitting said smoothed difference indicator from the target node to the source node; and using said smoothed difference indicator to adjust a transmitted power level used by the source node to transmit to the target node to be the minimum necessary to reliably transmit a packet.

7. The method of claim 6 further comprising the step of periodically increasing the stored minimum of previously obtained quantitative indicators of signal strength.

8. The method of claim 6 wherein said step of using said smoothed difference indicator comprises the substep of:

varying said transmitted power level to maintain said smoothed difference indicator at a predetermined threshold value.

9. A target node participating in a wireless packet communication link with a source node, said target node comprising:

a receiver that obtains a series of quantitative indicators of signal strength of packets successfully received from the target node;

a memory device that stores a minimum of previously obtained quantitative indicators of received signal strength;

a controller that obtains a series of differences between said series of quantitative indicators of signal strength and said minimum and that derives a source node transmitter control value from said series of differences; and a transmitter that transmits said control value to said source node to minimize power transmitted by the source node while maintaining link reliability.

10. The target node of claim 9 wherein said controller derives said source node control value by applying a smoothing transformation to said series of differences.

11. A source node participating in a wireless packet communication link with a target node, said source node comprising:

a transmitter that transmits packets to the target node at an adjustable power level;

a receiver that receives a series of difference indicators generated at the target node by comparing signal strengths of successfully received packets to a stored minimum of signal strengths of packets successfully received at the target node; and a controller that applies a smoothing transformation to said series of difference indicators to obtain a smoothed difference indicator and that varies said adjustable power level to maintain said smoothed difference indicator at a preselected threshold value.

\* \* \* \* \*